(12) United States Patent
Nikora

(10) Patent No.: US 9,550,506 B2
(45) Date of Patent: Jan. 24, 2017

(54) KEG TROLLEY

(71) Applicant: James Nikora, Labrador (AU)

(72) Inventor: James Nikora, Labrador (AU)

(*) Notice: Subject to any disclaimer, the term of this patent is extended or adjusted under 35 U.S.C. 154(b) by 0 days.

(21) Appl. No.: 14/760,478

(22) PCT Filed: Jan. 9, 2014

(86) PCT No.: PCT/AU2014/000011
§ 371 (c)(1),
(2) Date: Jul. 12, 2015

(87) PCT Pub. No.: WO2014/107764
PCT Pub. Date: Jul. 17, 2014

(65) Prior Publication Data
US 2015/0353112 A1  Dec. 10, 2015

(30) Foreign Application Priority Data
Jan. 11, 2013  (AU) .................................. 2013900091

(51) Int. Cl.
| | | |
|---|---|---|
| *B62B 1/14* | (2006.01) | |
| *B65G 7/12* | (2006.01) | |
| *B62B 1/26* | (2006.01) | |
| *B65G 65/24* | (2006.01) | |
| *B65G 7/04* | (2006.01) | |

(52) U.S. Cl.
CPC .................. *B62B 1/14* (2013.01); *B62B 1/264* (2013.01); *B65G 7/04* (2013.01); *B65G 7/12* (2013.01); *B65G 65/24* (2013.01); *B62B 2202/02* (2013.01); *B62B 2203/42* (2013.01)

(58) Field of Classification Search
CPC ...... B62B 1/14; B62B 1/264; B62B 2202/026; B62B 2202/02; B62B 3/104; B62B 2203/42
See application file for complete search history.

(56) References Cited

U.S. PATENT DOCUMENTS

| | | | | |
|---|---|---|---|---|
| 460,250 | A * | 9/1891 | Junkins ..................... | B62B 1/14 248/129 |
| 533,069 | A * | 1/1895 | Long ......................... | B62B 1/14 414/455 |
| 618,629 | A * | 1/1899 | Watts ........................ | B62B 1/264 280/47.29 |
| 757,793 | A * | 4/1904 | Vickers ..................... | B62B 1/14 414/455 |

(Continued)

FOREIGN PATENT DOCUMENTS

| | | |
|---|---|---|
| CN | 202953030 | 5/2013 |
| DE | 19729383 | 1/1999 |

(Continued)

OTHER PUBLICATIONS

Supplementary European Search Report dated Aug. 17, 2016 in respect of EP 14 73 8032.

*Primary Examiner* — John Walters
*Assistant Examiner* — James Triggs
(74) *Attorney, Agent, or Firm* — Eagar & Martin Pty Ltd

(57) ABSTRACT

The present invention generally relates to a keg trolley including a movable catch for catching hold under a lip of a keg. Preferably, the catch is movable so as to engage under different lips at various heights, when kegs are of different heights or placed on different types of pallets. In the preferred embodiment, the keg can be readily repositioned on a pallet by engaging the catch and moving the keg, without the need to actually touch the keg.

17 Claims, 1 Drawing Sheet

(56) References Cited

U.S. PATENT DOCUMENTS

| | | | | |
|---|---|---|---|---|
| 851,164 A * | 4/1907 | Davenport | B62B 1/14 | 414/455 |
| 1,438,334 A * | 12/1922 | Sabin | B62B 1/264 | 248/129 |
| 1,446,799 A * | 2/1923 | Hunziker | B62B 3/04 | 280/47.34 |
| 1,470,526 A * | 10/1923 | Cade | B62B 1/14 | 414/455 |
| 1,510,456 A * | 10/1924 | Cadwalader | B62B 1/264 | 248/129 |
| 1,512,454 A * | 10/1924 | Cade | B62B 3/12 | 280/47.27 |
| 1,615,919 A * | 2/1927 | Sheldon | B62B 1/264 | 280/47.27 |
| 1,738,096 A * | 12/1929 | Cole | B62B 3/104 | 248/129 |
| 1,866,887 A * | 7/1932 | Gleason | B62B 3/104 | 248/129 |
| 1,873,690 A * | 8/1932 | Ward | B62B 1/264 | 280/47.24 |
| 2,014,057 A * | 9/1935 | Rogers | B62B 1/264 | 280/47.27 |
| 2,160,041 A * | 5/1939 | Sooter | B62B 1/264 | 222/609 |
| 2,160,556 A * | 5/1939 | Miller | B62B 1/264 | 280/47.27 |
| 2,196,822 A * | 4/1940 | Bissell | B62B 1/264 | 414/456 |
| 2,272,447 A * | 2/1942 | Traxel | B62B 1/264 | 414/450 |
| 2,360,858 A * | 10/1944 | Ernst | B62B 3/04 | 414/622 |
| 2,385,514 A * | 9/1945 | Hawkins | B62B 3/104 | 280/10 |
| 2,406,183 A * | 8/1946 | Allen | B62B 1/12 | 280/13 |
| 2,417,644 A * | 3/1947 | Graham | B62B 1/10 | 280/47.24 |
| 2,447,300 A * | 8/1948 | Williams | B62B 1/264 | 298/2 |
| 2,447,435 A * | 8/1948 | Settle | B60B 29/002 | 414/428 |
| 2,472,670 A * | 6/1949 | McFarland | B62B 1/264 | 280/47.18 |
| 2,476,539 A * | 7/1949 | Fortin | B62B 1/264 | 280/47.27 |
| 2,485,085 A * | 10/1949 | Burch | B62B 1/10 | 280/47.12 |
| 2,511,623 A * | 6/1950 | Darcangelo | B62B 1/264 | 414/454 |
| 2,541,613 A * | 2/1951 | Roe | B62B 1/264 | 280/47.27 |
| 2,574,825 A * | 11/1951 | Guild | B62B 1/264 | 280/47.27 |
| 2,616,577 A * | 11/1952 | Barrett | B62B 1/264 | 414/450 |
| 2,622,851 A * | 12/1952 | Minor | F25D 31/006 | 165/46 |
| 2,635,775 A * | 4/1953 | Ernst | B62B 3/104 | 414/622 |
| 2,673,654 A * | 3/1954 | Kaufman | B62B 1/142 | 280/47.29 |
| 2,704,165 A * | 3/1955 | Hoover | B62B 1/264 | 280/47.24 |
| 2,764,420 A * | 9/1956 | Morrissy | B62B 1/264 | 280/33.991 |
| 2,779,492 A * | 1/1957 | Lapham | B62B 1/264 | 280/5.32 |
| 2,779,494 A * | 1/1957 | Kikuchi | B62B 1/264 | 254/8 R |
| 2,797,832 A * | 7/1957 | Weinmann | B62B 1/264 | 414/456 |
| 2,884,257 A * | 4/1959 | Menne | B62B 1/12 | 280/15 |
| 3,247,989 A * | 4/1966 | Uribe M | B62B 1/264 | 414/456 |
| 3,278,061 A * | 10/1966 | Christensen | B62B 1/264 | 280/47.27 |
| 3,278,218 A * | 10/1966 | Lebre | B62B 1/264 | 294/103.1 |
| 3,477,598 A * | 11/1969 | Hassell | B65G 7/02 | 294/104 |
| 3,674,164 A * | 7/1972 | Kaufman | B62B 1/264 | 414/450 |
| 3,815,767 A * | 6/1974 | Lund | B62B 1/264 | 280/47.18 |
| 3,845,968 A * | 11/1974 | Larson | B62B 1/264 | 248/129 |
| 3,897,096 A * | 7/1975 | Garrison | B65G 65/24 | 294/15 |
| 4,098,416 A * | 7/1978 | Fawley | B62B 1/264 | 280/47.24 |
| 4,106,648 A * | 8/1978 | Dickson | B62B 3/104 | 280/47.24 |
| 4,114,771 A * | 9/1978 | Heuckroth | B62B 1/14 | 414/450 |
| 4,257,729 A * | 3/1981 | Morissette | B62B 1/264 | 414/454 |
| 4,368,874 A * | 1/1983 | Weisgerber | B27B 17/0075 | 254/131 |
| 4,375,935 A * | 3/1983 | Miller | B62B 1/14 | 414/454 |
| 4,583,904 A * | 4/1986 | Maxwell | B62B 1/14 | 254/131 |
| 4,741,659 A * | 5/1988 | Berg | B62B 1/264 | 294/90 |
| 4,838,521 A * | 6/1989 | Moisan | B66F 19/005 | 254/131 |
| 4,902,187 A * | 2/1990 | Rousseau | B62B 1/264 | 280/47.27 |
| 5,405,235 A * | 4/1995 | Lebre | B62B 3/104 | 280/47.24 |
| 5,427,393 A * | 6/1995 | Kriebel | B62B 1/14 | 280/47.131 |
| 6,053,516 A * | 4/2000 | Ottaway | B62B 1/264 | 280/47.24 |
| 6,382,642 B1* | 5/2002 | Rainey | B62B 1/264 | 280/47.24 |
| 6,397,435 B1* | 6/2002 | Gosselet | B60N 3/023 | 16/438 |
| 6,663,067 B2* | 12/2003 | Gordon | A47G 25/065 | 224/553 |
| 7,012,181 B2* | 3/2006 | Tran | G10D 3/043 | 84/318 |
| D523,205 S * | 6/2006 | Burks | B62B 1/264 | D34/24 |
| 7,740,251 B2* | 6/2010 | Simmons | B62B 1/264 | 280/43.11 |
| D635,320 S * | 3/2011 | Paoletto | B62B 1/264 | D34/26 |
| 8,276,923 B2* | 10/2012 | Plesh | B62B 1/12 | 280/47.23 |
| 8,480,058 B2* | 7/2013 | Matthews | E04F 21/1894 | 254/120 |
| 9,073,565 B1* | 7/2015 | Efraimson | B62B 1/145 | |
| 9,308,927 B2* | 4/2016 | Weaver | B62B 1/264 | |
| 2015/0353112 A1* | 12/2015 | Nikora | B62B 1/14 | 280/47.24 |

FOREIGN PATENT DOCUMENTS

| | | |
|---|---|---|
| GB | 2351475 | 1/2001 |
| GB | 2390325 | 1/2004 |
| GB | 2420771 | 6/2006 |
| WO | WO2009050678 A2 | 4/2009 |

* cited by examiner

KEG TROLLEY

TECHNICAL FIELD

The present invention generally relates to a keg trolley. The present invention has particular, although not exclusive application to a beer keg trolley.

BACKGROUND

The reference to any prior art in this specification is not, and should not be taken as an acknowledgement or any form of suggestion that the prior art forms part of the common general knowledge.

Beer keg trolleys are used to transport unwieldy and heavy beer kegs to and from pallets.

A known type of beer keg trolley has a fixed hook for catching in a hand hole of a keg's chime lip. Undesirably, the heavy beer kegs often need to be manually handled to align the hand hole and hook, or to stabilize a rocking keg during transport, which presents work and safety issues.

Further, ramps often need to be employed when transporting elevated kegs to and from a pallet or step to align the hand hole and hook. Even so, it is often difficult to align the hook to engage within the hand hole when kegs are of different height or placed on different types of pallets.

The preferred embodiment provides an improved beer keg trolley.

SUMMARY OF THE INVENTION

According to one aspect of the present invention, there is provided a keg trolley including a movable catch for catching hold under a lip of a keg.

Preferably, the catch is movable so as to engage under different lips at various heights, when kegs are of different heights or placed on different types of pallets. In the preferred embodiment, the keg can be readily repositioned on a pallet by engaging the catch and moving the keg, without the need to actually touch the keg.

The catch may catch hold under opposing sides of the keg so that the keg is stably held.

The trolley may further include a lever arm which is terminated by the catch. The lever arm may be bent to facilitate catching of elevated kegs, especially on a pallet. The catch may include a rod with tapered ends to facilitate engagement with a curved wall of the keg. The trolley may further include biasing means for biasing the catch downwards against the keg in use.

The trolley may further include a support to which the lever arm is pivotally mounted. The support may be bent to facilitate levering of the keg. The lever arm may define a lever handle opposite the catch. The support may be pivotally connected relative to a wheel axle.

The trolley may further include a pair of motion limiters for limiting motion of the support so that the keg can be transported in different positions. The trolley may further include a bumper against which a base of the keg can engage. The trolley may include a cradle for cradling the cylindrical keg.

The trolley may further include a pair of wheels mounted to the axle, and a trolley handle to facilitate wheeling of the trolley.

In one embodiment, the keg trolley includes a stand for enabling the trolley to stand upright. The stand may include a kick stand.

According to another aspect of the present invention, there is provided a keg catch for catching hold under a lip of a keg.

According to another aspect of the present invention, there is provided a hand-operated keg handling tool including an arm terminating in the catch.

The arm may terminate in a handle.

BRIEF DESCRIPTION OF THE DRAWINGS

Preferred features, embodiments and variations of the invention may be discerned from the following Detailed Description which provides sufficient information for those skilled in the art to perform the invention. The Detailed Description is not to be regarded as limiting the scope of the preceding Summary of the Invention in any way. The Detailed Description will make reference to a number of drawings as follows.

DETAILED DESCRIPTION OF PREFERRED EMBODIMENTS

Figure 1B:
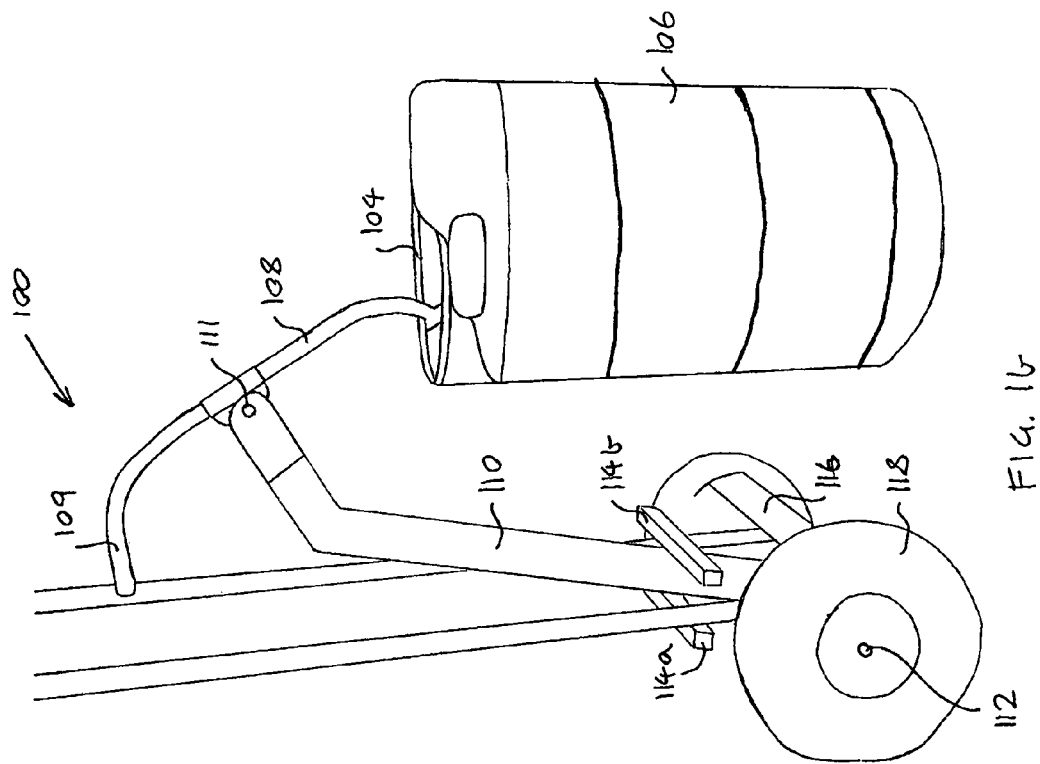
FIG. 1b is a side perspective view of the beer keg trolley of FIG. 1a with the catch engaged to catch hold under a lip of a keg.

According to an embodiment of the present invention, there is provided a beer keg trolley 100 as shown in FIG. 1. The trolley 100 includes a movable catch 102 for catching hold under a generally inverted "L-shaped" chime lip 104 of a beer keg 106. Advantageously, the catch 102 is movable so as to engage under different lips 104 at various heights, when kegs 106 are of different heights or placed on different types of pallets. The keg 106 can be readily repositioned on a pallet by engaging the catch 102 and moving the keg 106, without the need to actually touch the keg 106.

The catch 102 includes a rod with tapered ends to complementarily engage with a inner curved side wall of the keg 106. The tapered ends of the catch 102 also catch hold under opposing sides of the keg 106 so that the keg 106 is stably held during transportation.

The trolley 100 further includes a lever arm 108 which is terminated at one end by the catch 102. The other end of the lever arm defines a lever handle 109 opposite the catch 102. The lever arm 108 is bent to facilitate catching of elevated kegs 106, especially sitting on a pallet. The trolley 100 further includes a torsional spring 111 (i.e. biasing means) for biasing the catch 102 downwards against the roof of the keg 106 in use.

The trolley 100 further includes an upright support 110 to which the lever arm 108 is pivotally mounted about its centre. The support 110 is bent to facilitate levering of the heavy keg 106. The upright support 110 is also pivotally connected relative to a wheel axle 112.

The trolley 100 further includes a pair of motion limiters 114a, 114b for limiting pivotal motion of the support 110 so that the keg 106 can be transported in different forward or rearward positions. The trolley 100 further includes a front bumper 116 against which a base of the cylindrical keg 106 can rest during transportation.

A pair of wheels 118 is mounted to the axle 112, and a trolley handle 120 extends upwardly from the axle 112 to facilitate wheeling of the trolley 100.

A method of using the trolley 100 is now briefly described.

Figure 1A:
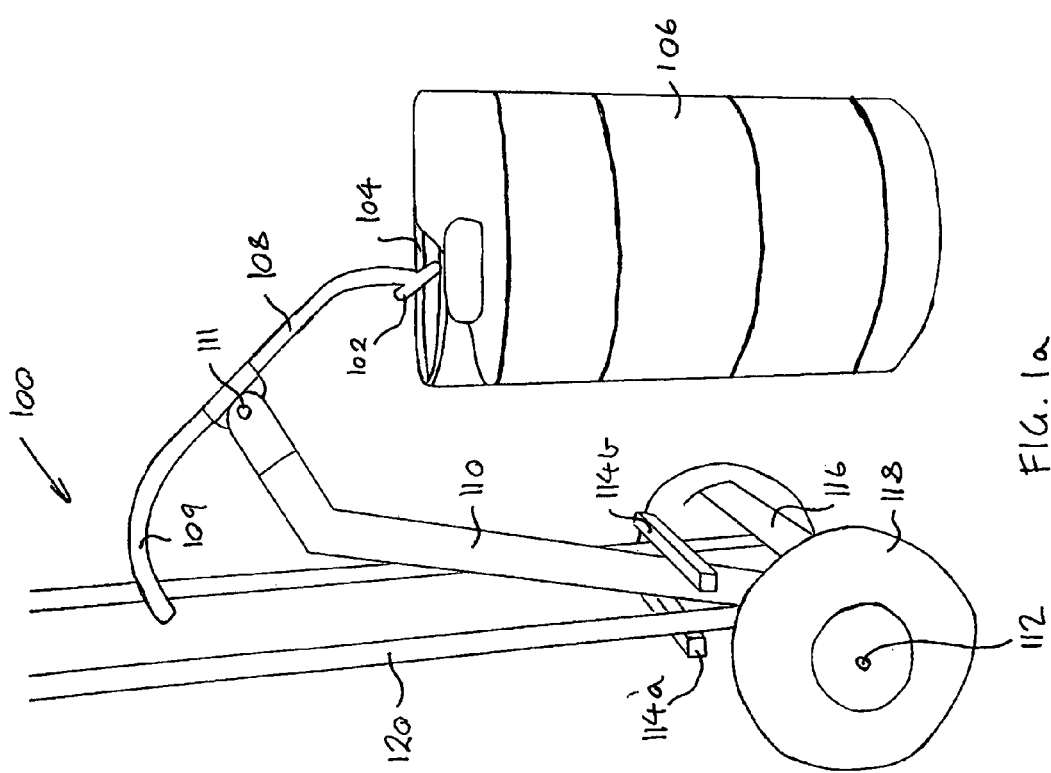
FIG. 1a is a side perspective view of a beer keg trolley having an unengaged catch, in accordance with an embodiment of the present invention.

In use, the user wheels the unloaded trolley 100 to the keg 106 with the upright support 110 in a front position as shown in FIG. 1a. The keg 106 may be resting on a pallet and the user operates the lever handle 109 to lift the catch 102 up and over the chime lip 104.

The spring 111 (i.e. biasing means) biases the catch 102 downwards against the roof of the keg 106 when the user releases the lever handle 109. The user pulls the trolley 100 backwards using trolley handle 120 until the tapered ends of the catch 102 engage on opposite sides of the inner curved side wall of the keg 106.

The user then tilts the trolley 100 rearwards, using the trolley handle 120, so that the catch 102 catches hold under the chime lip 104 of the beer keg 106. In turn, the cylindrical base of the keg 106 rests against the bumper 116 and the loaded trolley 102 can be freely wheeled around on wheels 118.

The keg 106 is transported in a titled configuration. The keg 106 can be released by simply tilting and then pushing the trolley 100 forward, and then lifting the catch 102 over the chime lip 104 using lever handle 109 whilst tilting and pulling the trolley 100 backwards.

As indicated above, the trolley 100 is particularly well suited to loading and unloading varying-dimensioned elevated beer kegs 100 onto and from pallets.

The lever of the trolley 100 also can be used in isolation when not attached to the rest of the trolley 100 as a hand-held keg handling tool operated by a single hand.

The keg handling tool includes the lever handle 109, lever arm 108 and catch 102. The lever handle 109 and lever arm 108 are formed from a bent metal rod or bar, and the metal catch 102 is welded to the end of the arm 108.

In use, the catch 102 of the keg handling tool can be moved and caught under the chime lip 104 of a beer keg 106 when the user holds the lever handle 109 in one hand. The user can then push on the handle 109 to topple the keg 106 onto its side. Once the keg 106 is on its side, the user can roll the keg 106 by pushing it with the handling tool. The keg handling tool can then be caught under the chime lip 104 of a beer keg 106 to drag the keg 106, or pulled to elevate the keg 106 to standing once again.

A person skilled in the art will appreciate that many embodiments and variations can be made without departing from the ambit of the present invention.

In one embodiment, one or more brackets may be mounted to the front of the support 110 in place of the bumper 116 to cradle and further support the cylindrical keg 106.

In the preferred embodiment, the support 110 remained in either a front or rearward position during handling of the keg 100 to suit the user's preference. In another embodiment, the support 110 may flip from the front to the rearward position during loading, and from the rearward to the front position during unloading. In another embodiment, the support 110 may be fixed and not pivot at all.

In one embodiment, the keg trolley 100 includes a stand for enabling the trolley to stand upright. The stand can include a kick stand.

In compliance with the statute, the invention has been described in language more or less specific to structural or methodical features. It is to be understood that the invention is not limited to specific features shown or described since the means herein described comprises preferred forms of putting the invention into effect.

The claims defining the invention are as follows:

1. A keg trolley comprising:
   a moveable lever arm including a handle at one end thereof and a catch at another end thereof, said handle having a length, said catch having opposed first and second ends and a central longitudinal axis passing through said first and second ends of said catch, said first and second ends of said catch each being configured to catch hold under opposed portions of a chime lip of a keg when said catch is engaged with the chime lip of the keg;
   a support to which the lever arm is pivotally mounted;
   biasing means for biasing the catch downwards against the roof of the keg; and
   a bumper against which a base of the keg is configured to engage.

2. The keg trolley as claimed in claim 1, wherein the central longitudinal axis of said catch is non-parallel relative to the length of said handle.

3. The keg trolley as claimed in claim 1, wherein said support is connected to an axle with opposed first and second wheels, said bumper being spaced from said axle a distance less than a radius of one of said wheels.

4. The keg trolley as claimed in claim 1, wherein the catch is configured as a rod.

5. The keg trolley as claimed in claim 1, wherein the lever arm is bent to facilitate catching of elevated kegs.

6. The keg trolley as claimed in claim 1, wherein the support is bent to facilitate levering of the keg.

7. The keg trolley as claimed in claim 1, wherein said first and second ends of said catch are each tapered.

8. The keg trolley as claimed in claim 1, wherein the biasing means is a torsional spring.

9. The keg trolley as claimed in claim 1, further including a pair of wheels mounted to an axle, and a trolley handle to facilitate wheeling of the trolley.

10. The keg trolley of claim 1, further comprising an axle and a longitudinal trolley handle extending upwardly from said axle, said support projecting at an angle from said longitudinal trolley handle.

11. The keg trolley of claim 10, wherein said support includes an end with a pivot point spaced apart from said longitudinal trolley handle.

12. The keg trolley of claim 1, further comprising an axle and a trolley handle extending upwardly from said axle, said support being fixed relative to said trolley handle.

13. A keg trolley, comprising:
    a longitudinal trolley handle including an axle and a pair of wheels at one end of said longitudinal trolley handle;
    a support arm projecting at an angle from said longitudinal trolley handle, said support arm including a pivot point spaced apart from said longitudinal trolley handle; and
    a moveable lever arm pivotally connected at said pivot point of said support arm, said lever arm including a handle at one end thereof and a catch at another end thereof, said catch having opposed first and second ends and a central longitudinal axis passing through said first and second ends of said catch, said first and second ends of said catch each being configured to catch hold under opposed portions of a chime lip of a keg when said catch is engaged with the chime lip of the keg.

14. The keg trolley of claim 13, further comprising a means for biasing said catch downwards against a roof of the keg.

15. The keg trolley of claim 14, wherein said means for biasing includes a torsional spring.

16. The key trolley of claim 13, wherein said lever arm is pivotally connected generally mid-way between the ends of said lever arm.

17. The keg trolley of claim 13, wherein the central longitudinal axis of said catch is non-parallel relative to the length of said handle of said lever arm.

* * * * *